Patented Nov. 19, 1946

2,411,397

UNITED STATES PATENT OFFICE 2,411,397

PRODUCTION OF SODIUM CYANAMIDE-FORMALDEHYDE CONDENSATION PRODUCT

Joseph Frederic Walker, Lewiston, N. Y., assignor to E. I. du Pont de Nemours & Company, Wilmington, Del., a corporation of Delaware No Drawing. Application July 4, 1945, Serial No. 603,255

8 Claims. (Cl. 260—42)

This invention relates to a new and improved sodium cyanamide-formaldehyde condensation product, and method for producing same. The product of this invention has particular utility as a brightening agent in the electroplating of zinc.

In my copending application Serial No. 507,182, filed October 21, 1943, I have disclosed the sodium cyanamide-formaldehyde condensation product produced by reacting sodium cyanamide ($Na_2CN_2$), as such, with formaldehyde in substantially equimolecular proportions in an aqueous reaction medium. Although the product produced in accordance with that process is greatly superior as a brightening agent for certain electroplating solutions than similar condensation products, for example, the product produced by the process of Schmidt Patent No. 1,791,434, numerous difficulties have been encountered in producing a product of consistently good quality. The process of my prior, above-identified application often resulted in a product which was highly compressible and difficult to wash and filter. The said product was extremely heat-sensitive when wet and often could not be satisfactorily dried with an air drier or oven drier without objectionable resinification to a dark, opaque material.

It is an object of this invention to produce a sodium cyanamide-formaldehyde condensation product which has a satisfactory heat stability, and which will function satisfactorily as a brightening agent in zinc plating from a zinc cyanide plating bath or from an acid type zinc bath.

It is another object of this invention to produce a sodium cyanamide-formaldehyde condensation product which can be satisfactorily air dried or oven dried without objectionable resinification.

It is another object of this invention to produce a sodium cyanamide-formaldehyde condensation product which can be readily washed and filtered, which can be satisfactorily air dried or oven dried, and which will function satisfactorily as a brightening agent in zinc plating from a zinc-plating bath.

It is another object of this invention to provide a process for the production of a sodium cyanamide-formaldehyde condensation product which process can be readily controlled to produce a product of consistently good quality.

Other objects of the invention will appear hereinafter.

The objects of this invention may be accomplished, in general, by reacting, in aqueous solution and at a temperature below 45° C., approximately equimolecular amounts of monosodium cyanamide and formaldehyde, and precipitating the resulting condensation product by the addition of sufficient strong acid to reduce the pH of the mixture to between 8 and 9.

As stated in my copending application, the product is probably a partially hydrated polymer of methylene cyanamide ($CH_2=NCN$) in which approximately two-thirds of the CN radicals have been converted to amide groups. Analyses for carbon, hydrogen, and nitrogen indicate that its composition closely approximates the empirical formula, $C_6H_{10}N_6O_2$. The characteristics of the product are those of an amorphous resin, and it is probably not a simple compound of low molecular weight but rather a polymer or mixture of polymers made up of units corresponding to the $C_6H_{10}N_6O_2$ formula. It is believed that the structural formula of this polymer unit is as follows:

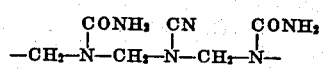

Despite the fact that the product of this application is believed to have approximately the same empirical formula as that of my copending application, there are some chemical or physical differences between these products as is evidenced by the fact that the product of this invention is considerably more heat stable, and approximately one-half the quantity of the product of this invention will have the same brightening characteristics in a zinc cyanide plating process as a given quantity of the product obtained by the process of my above-said copending application.

In accordance with the preferred process for the production of the product of the present invention, equivalent amounts of $Na_2CN_2$ and a strong acid are reacted in aqueous solution at a temperature between 5° C. and 45° C., to form an aqueous solution of monosodium cyanamide having a pH of about 10.5. Formaldehyde is added to the aqueous solution in substantially equimolecular amount to said monosodium cyanamide contained therein. The reaction between formaldehyde and monosodium cyanamide which takes place is exothermic, and the temperature of the reaction mixture should be regulated, by cooling if necessary, to maintain the same between 5° C. and 45° C. When carried out at room temperature (about 21° C.) the reaction between the cyanamide and formaldehyde is complete in about four to six hours. After the reaction is complete, the sodium cyanamide-formaldehyde reaction product is precipitated by the addition of sufficient strong acid to lower the pH value of the reaction mixture to between 8 and 9. The resulting slurry is then filtered and the solids washed with water and dried.

The strong acid used in forming the monosodium cyanamide, or in precipitating the cyanamide-formaldehyde reaction product, is preferably hydrochloric acid. However, sulfuric acid, phosphoric acid or acetic acid may also be used to good effect. Preferably, the acid used is in aqueous solution, for example 15% to 37% HCl or 20% to 60% $H_2SO_4$, and in the said two steps the acid used should preferably be the same acid.

As stated above, the formation of the monosodium cyanamide and the reaction between it and formaldehyde is carried out in aqueous solution. These aqueous solutions may be, optionally, substantially saturated solutions or relatively weak solutions, the only considerations being that the pH of the solution is at least 9.5, and preferably about 10.5, and the economy and ease of handling and manipulation of the reactants and products.

In order to obtain a reasonable yield and avoid unnecessary decomposition of reactants or reaction products, both the formation of monosodium cyanamide and the reaction between the cyanamide and formaldehyde should be carried out at a temperature between 5° C. and 45° C. In order to obtain most efficient results, it is preferred that these reactions be carried out within the temperature range 25° C. and 35° C. The precipitation of the reaction product is preferably carried out at a temperature below 30° C.

The formaldehyde added to the aqueous solution of monosodium cyanamide may be in the form of an aqueous solution of formaldehyde of the type commercially marketed or of other concentration, or it may be in the form of paraformaldehyde, or other polymer of formaldehyde which will readily form formaldehyde under the conditions of the reaction. Reference to the use of formaldehyde as a reactant throughout the specification and claims is, therefore, meant to include formaldehyde, paraformaldehyde, and other linear polyoxymethylene-type polymers.

After acidification of the products of the reaction to a pH of between 8 and 9, the precipitated reaction product will form a slurry in the liquid medium. Preferably, the precipitation is allowed to proceed for a period of two hours or more to insure complete precipitation. The slurry is then filtered, for example, by means of a suction filter, or equivalent filter, and the filter cake is preferably reslurried six to eight times with tap water and the wash water removed by filtration and/or decantation. The washed filter cake may be dried by placing the same on a screen, for example, a 16-mesh screen and positioning the screen in an air drier in which the air at a temperature of between 40° C. and 75° C. is passed into contact with the filter cake, or through the same, until moisture content is below 5%. The temperature of the air in the drier may be raised somewhat during the last stages of the drying operation. The drying may also be carried out in a conventional oven drier or on a drum drier, if desired.

The dried product is discharged from the drier in small lumps or granules and, if desired, these may be pulverized by means of a mechanical pulverizer to any suitable size.

For use as a brightening agent in a zinc cyanide, or other metal cyanide, electroplating process the pulverized cyanamide-formaldehyde condensation product is preferably dry-mixed with 1% to 2% by weight of low viscosity polyvinyl alcohol having a saponification number of between 0 and 18.

The following examples illustrate, in detail, certain preferred procedures for carrying out the process of the invention, it being understood that the invention is not to be limited to the specific details set forth therein.

*Example I*

One gram mole of monosodium cyanamide was added to one gram mole of formaldehyde in the form of a 12% aqueous solution having a temperature of 0° C. to 10° C. After a reaction period of 1.5 hours at a temperature between 10° C. and 30° C., the mixture was chilled to a temperature of 10° C. and 37% hydrochloric acid added, while agitating the mixture, until the mixture had a pH value of between 8 and 9. A white precipitate separated from the solution. After standing overnight to insure substantially complete precipitation, the precipitate was filtered off, washed with water and dried in a vacuum desiccator, the yield of product was 45.7 grams, and represents a yield of 0.71 gram product per gram of monosodium cyanamide.

*Example II*

One mole (90.5 grams) technical grade sodium cyanamide was dissolved in 200 cc. water at 0° to 10° C. Eighty-three (83) cc. concentrated hydrochloric acid (one mole HCl) was added dropwise to the cold solution while shaking the same in a flask. Then 81 grams of 37% formaldehyde solution (one mole formaldehyde) was slowly added to the cold solution while stirring and the reaction allowed to proceed for a period of 3.5 hours during which the temperature of the reaction mass was not allowed to exceed 40° C. The solution was then chilled to a temperature of about 10° C. and concentrated hydrochloric acid was added until the pH value of the solution was between 8 and 9. The mass was allowed to stand overnight after which the resulting precipitate was filtered off. The filter cake was washed with water and dried in a vacuum desiccator.

Weight of product _____ 49.20 grams
Yield _____ 0.54 gram/g. $Na_2CN_2$

*Example III*

One mole (90.5 gram) technical grade sodium cyanamide was dissolved in 250 cc. water at a temperature of 15° C. to 20° C., after which one equivalent (123 grams) of 40% aqueous sulfuric acid was added dropwise to the cold solution while shaking the solution in a flask. Eighty-one (81) grams of 37% formaldehyde solution (one mole formaldehyde) was added dropwise to the reaction mixture while maintaining the temperature thereof between 15° C. and 20° C. When the addition of formaldehyde was completed (30 minutes), the reaction mixture was treated with 40% aqueous sulfuric acid until the pH was between 8 and 9. After maintaining the resulting reaction mixture at a temperature of about 25° C. for one hour to allow precipitation to take place, the solid product was filtered off, washed with water and dried in a vacuum desiccator. A second crop of precipitated solid was removed after another fourteen hours and a third crop two days later. About 7% of the formaldehyde used remained in the filtrate.

Results were as follows:

| | |
|---|---|
| Weight of first crop | 28.8 grams |
| Weight of second crop | 16.3 grams |
| Weight of third crop | 1.0 gram |
| Weight of total | 46.1 grams |
| Yield | 0.51 gram/g. $Na_2CN_2$ |

*Example IV*

1. The sodium cyanamide-formaldehyde reaction product is produced by the following four steps:

(a) A solution of 286 pounds of sodium cyanamide in 450 pounds of city water is prepared in a jacketed reactor equipped with an anchor-type agitator. Rates of cyanamide feed and flow of coolant in the jacket are regulated to maintain the temperature at 30° C. to 35° C.

(b) Following the addition of $Na_2CN_2$, the solution is agitated for thirty minutes, cooled to 10° C., and neutralized with 24% HCl to $NaHCN_2$, the rates of acid feed and coolant being regulated to maintain the temperature at 28° C. to 35° C. Following the neutralization, the solution is cooled to 10° C.

(c) One hundred (100) pounds of 96% formaldehyde is added in two equal portions, and the cooling is regulated to limit the temperature to a peak of 33° C. to 35° C., following each addition. The charge is then cooled to 15° C.

(d) The product is precipitated by neutralizing the solution to a pH of 9.0 with 24% HCl while the temperature is maintained at 18° C. to 21° C. The slurry is agitated for one hour, dropped to a Nutsch filter, and a volume of city water, equal to the volume of slurry, is added.

2. The cyanamide - formaldehyde reaction product is collected, washed, and dried according to the following procedure:

(a) Vacuum is applied to the Nutsche and the filtrate is removed, partially by decantation as the solids settle, and partially by direct filtration.

(b) The filter cake is reslurried six to eight times with city water, and the wash water is removed by filtration and decantation.

(c) The washed filter cake is dried on 16-mesh screen in an air drier at 60° C., until the moisture content is less than 10%. Drying is continued at 65° C. to 70° C. until the moisture is below 5.0%.

(d) The dry product is discharged from the drier as small lumps and reduced to minus 40 mesh in a micro-pulverizer.

Although the product of the present invention has many other uses such as the use as a flame-proofing agent, use in the manufacture of heat-resistant resins, use as an acid-inhibitor in the pickling of steel, it has particular utility as a brightening agent in electroplating processes, especially in electroplating processes employing metal cyanide salt plating baths. Tests have been carried out to determine its utility as a brightening agent in zinc electroplating both from zinc cyanide plating solutions and from acid zinc electrolytes. In a zinc cyanide plating process it is highly desirable to combine a sodium cyanide-formaldehyde condensation product with a small amount of low viscosity polyvinyl alcohol and add such mixture to the plating bath as a brightening agent. Usually, 90% to 99% of the condensation product is added to 10% to 1% of polyvinyl alcohol having a saponification number between 0 and 18, and a small amount of this mixture is added to the zinc plating bath. When used as a brightening agent in the acid zinc electrolytes no polyvinyl alcohol is added. The brightening agent, in such processes, has particular utility in producing a bright plate at varying current densities. A great variation in current densities cannot be avoided in plating objects of irregular outline.

The product of the present invention may be used in considerably smaller quantity in zinc plating baths to produce a given brightness than the sodium cyanamide-formaldehyde condensation product of my above-mentioned copending application.

A comparison of the two products with regard to their effective concentration in a zinc cyanide plating bath, the percentage content of chloride (as NaCl) in the product, and the percentage of water in the product is given below:

| | Product of present process | Product of process of S. N. 507,182 |
|---|---|---|
| Effective concentration in plating solution_____grams per liter__ | 1.3-1.9 | 2.5-3.8 |
| Per cent chloride as NaCl in product__ | 1.0 | 10 to 15 |
| Per cent $H_2O$ in product_____ | 5.0 | 10.0 |

The product of the present invention can be air dried at a given temperature with only occasional occurrence of resinification, and the degree of resinification is negligible. In several experiments the reaction temperature has been allowed to reach 40° C. to 42° C. with no apparent deleterious effect except that the product becomes slightly discolored (pink to orange). Since the reaction, in accordance with the present invention, proceeds at a pH of about 10.5, difficulties with poor heat stability have been largely eliminated. The resulting precipitated product appears to be looser than the similar product produced by previously known processes and is not as highly compressible and, therefore, is more readily washed and filtered.

Throughout the specification and claims reference to parts, proportions and percentages is meant to refer to parts, proportions and percentages by weight unless otherwise specified.

Since it is obvious that many changes and modifications can be made in the above-described details without departing from the nature and spirit of the invention, it is to be understood that the invention is not to be limited thereto, except as set forth in the appended claims.

I claim:

1. The process for the production of a sodium cyanamide-formaldehyde condensation product which comprises reacting, in aqueous solution and at a temperature below 45° C., approximately equimolecular amounts of monosodium cyanamide and formaldehyde, and precipitating the resulting product by the addition of sufficient strong acid to reduce the pH of the mixture to between 8 and 9.

2. The process for the production of a sodium cyanamide-formaldehyde condensation product which comprises reacting, in aqueous solution having a pH above 9.5 and at a temperature below 45° C., approximately equimolecular amounts of monosodium cyanamide and formaldehyde, and precipitating the resulting product by the addition of sufficient strong acid to reduce the pH of the mixture to between 8 and 9.

3. The process for the production of a sodium cyanamide-formaldehyde condensation product which comprises reacting, in aqueous solution having a pH of about 10.5 and at a temperature below 45° C., approximately equimolecular amounts of monosodium cyanamide and formaldehyde, and precipitating the resulting product by the addition of sufficient strong acid to reduce the pH of the mixture to between 8 and 9.

4. The process for the production of a sodium cyanamide-formaldehyde condensation product which comprises reacting, in aqueous solution, approximately equivalent amounts of sodium cyanamide and a strong acid whereby to produce an aqueous solution of monosodium cyanamide having a pH above 9.5, reacting the resulting solution, at a temperature below 45° C., with an amount of formaldehyde approximately equimolecular with said sodium cyanamide, and precipitating the resulting product by the addition of sufficient strong acid to reduce the pH of the mixture to between 8 and 9.

5. The product obtained by the process of claim 1.

6. The product obtained by the process of claim 4.

7. The product obtained by the process of claim 1 admixed with 1% to 10% by weight of polyvinyl alcohol having a saponification number between 0 and 18.

8. The product obtained by the process of claim 4 admixed with 1% to 10% by weight of polyvinyl alcohol having a saponification number between 0 and 18.

JOSEPH FREDERIC WALKER.